(12) United States Patent
Komuro

(10) Patent No.: US 11,286,377 B2
(45) Date of Patent: Mar. 29, 2022

(54) ETHYLENE-VINYL ALCOHOL COPOLYMER COMPOSITION, MULTILAYER STRUCTURE, AND PACKAGE

(71) Applicant: Mitsubishi Chemical Corporation, Tokyo (JP)

(72) Inventor: Ryohei Komuro, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/860,575

(22) Filed: Apr. 28, 2020

(65) Prior Publication Data

US 2020/0263009 A1 Aug. 20, 2020

Related U.S. Application Data

(63) Continuation of application No. PCT/JP2018/043117, filed on Nov. 22, 2018.

(30) Foreign Application Priority Data

Nov. 22, 2017 (JP) .............................. JP2017-224271

(51) Int. Cl.
```
C08L 23/08     (2006.01)
B32B 27/08     (2006.01)
C08K 5/098     (2006.01)
C08K 5/101     (2006.01)
C08L 29/04     (2006.01)
```

(52) U.S. Cl.
CPC .............. *C08L 23/08* (2013.01); *B32B 27/08* (2013.01); *C08K 5/098* (2013.01); *C08K 5/101* (2013.01); *C08L 29/04* (2013.01); *B32B 2553/00* (2013.01)

(58) Field of Classification Search
CPC ...... C08L 23/08; C08L 23/0861; C08L 29/04; B32B 27/08; B32B 2553/00; C08K 5/098; C08K 5/101; B29K 2105/0044; B29K 2023/086; B29B 9/12; B29B 9/065
See application file for complete search history.

(56) References Cited

U.S. PATENT DOCUMENTS

| | | | |
|---|---|---|---|
| 4,877,662 A | 10/1989 | Yazaki et al. | |
| 5,034,281 A | 7/1991 | Kawasaki et al. | |
| 5,082,743 A | 1/1992 | Itamura et al. | |
| 5,744,547 A | 4/1998 | Moritani et al. | |
| 5,981,011 A | 11/1999 | Overcash et al. | |
| 10,066,095 B2* | 9/2018 | Nakazawa | ............... C08L 29/04 |
| 10,081,167 B2* | 9/2018 | Kawai | .................. C08L 23/0861 |
| 2015/0041462 A1* | 2/2015 | Nakazawa | ........... B65D 1/0215 220/4.13 |
| 2015/0105508 A1 | 4/2015 | Nakazawa et al. | |
| 2015/0159005 A1* | 6/2015 | Nakazawa | ............... B32B 27/08 426/412 |
| 2016/0177080 A1 | 6/2016 | Inoue | |
| 2016/0221314 A1* | 8/2016 | Kawai | ................. C08L 23/0861 |
| 2018/0319965 A1 | 11/2018 | Seno et al. | |
| 2019/0077945 A1* | 3/2019 | Hashimoto | ......... C08L 23/0869 |
| 2019/0292359 A1 | 9/2019 | Inoue et al. | |

FOREIGN PATENT DOCUMENTS

| | | |
|---|---|---|
| EP | 2554590 | 2/2013 |
| EP | 2862898 | 4/2015 |
| EP | 3053960 | 8/2016 |
| JP | 61-220839 | 10/1986 |
| JP | 62-068743 | 3/1987 |
| JP | 62-152847 | 7/1987 |
| JP | 01-279949 | 11/1989 |
| JP | 03-192140 | 8/1991 |
| JP | 09-071620 | 3/1997 |
| JP | 10-511903 | 11/1998 |
| JP | 2010-241863 | 10/2010 |
| JP | 2015-083665 | 4/2015 |
| JP | 2018-109110 | 7/2018 |
| JP | 2018-145395 | 9/2018 |
| WO | 2013/146961 | 10/2013 |

(Continued)

OTHER PUBLICATIONS

ISR issued in WIPO Patent Application No. PCT/JP2017/019451, Aug. 15, 2017, English translation.
IPRP issued in WIPO Patent Application No. PCT/JP2017/019451, Nov. 27, 2018, English translation.
ISR issued in WIPO Patent Application No. PCT/JP2018/043117, Feb. 5, 2019, English translation.
IPRP issued in WIPO Patent Application No. PCT/JP2018/043117, May 26, 2020, English translation.
EESR issued in EP Patent Application No. 18880661.6, dated Dec. 15, 2021.

*Primary Examiner* — Robert S Jones, Jr.

(74) *Attorney, Agent, or Firm* — Greenblum & Bernstein, P.L.C.

(57) ABSTRACT

Problem to be solved:

To provide an ethylene-vinyl alcohol copolymer composition which is excellent in impact resistance even without a resin other than an ethylene-vinyl alcohol copolymer blended therein.

Solution to the problem:

Use an ethylene-vinyl alcohol copolymer resin composition contains: (A) an ethylene-vinyl alcohol copolymer; (B) an aliphatic carboxylic acid metal salt; and (C) a sorbic acid ester; wherein the aliphatic carboxylic acid metal salt (B) contains a metal moiety selected from the group consisting of long Periodic Table $10^{th}$ to $12^{th}$ element metals; wherein the sorbic acid ester (C) is present in an amount of 0.0001 to 10 ppm based on the total amount of the ethylene-vinyl alcohol copolymer (A), the aliphatic carboxylic acid metal salt (B), and the sorbic acid ester (C).

5 Claims, No Drawings

(56) References Cited

FOREIGN PATENT DOCUMENTS

WO 2015/041135 3/2015
WO 2017/082063 5/2017

* cited by examiner ized. Therefore, the transportation of foods, chemicals, and other articles tends to require longer transportation periods. Hence, there is a demand for an EVOH-based multilayer structure (package) excellent in gas barrier properties and impact resistance, i.e., having a higher resistance to fall and impact during longer-period transportation and handling.

ETHYLENE-VINYL ALCOHOL COPOLYMER COMPOSITION, MULTILAYER STRUCTURE, AND PACKAGE

RELATED APPLICATION

This application is a continuation of International Application No. PCT/JP2018/043117, filed on Nov. 22, 2018, which claims priority to Japanese Patent Application No. 2017-224271, filed on Nov. 22, 2017, the entire contents of each of which being hereby incorporated by reference.

TECHNICAL FIELD

The present disclosure relates to an ethylene-vinyl alcohol copolymer composition (hereinafter referred to as "EVOH resin composition") containing an ethylene-vinyl alcohol copolymer (hereinafter referred to as "EVOH"), a multilayer structure produced by using the EVOH resin composition, and a package. More specifically, the present disclosure relates to an EVOH resin composition excellent in impact resistance, a multilayer structure produced by using the EVOH resin composition, and a package.

BACKGROUND ART

EVOH has crystalline portions formed due to firm hydrogen bonds between hydroxyl groups richly present in its molecular chains, and these crystalline portions prevent intrusion of oxygen from the outside. Therefore, EVOH is excellent in gas barrier properties, e.g., oxygen barrier property. EVOH is generally used for an intermediate layer of a laminate structure including resin layers laminated together, and the laminate structure is used for various packages.

As described above, EVOH is excellent in gas barrier properties, but tends to be brittle because of its higher crystallinity due to the hydroxyl groups richly present in its molecular chains. Therefore, the EVOH layer of a package is liable to suffer from cracking and pinholes to be thereby broken by impact or the like.

For improvement of the impact resistance of the EVOH, for example, PTL 1 and PTL 2 disclose laminate packages each including a layer of a resin composition containing an EVOH and an ethylene-vinyl acetate copolymer. Further, PTL 3 and PTL 4 disclose laminates each including a layer of a resin composition containing an EVOH and a partially saponified ethylene-vinyl acetate copolymer.

RELATED ART DOCUMENTS

Patent Documents

PTL 1: JP-A-SHO61 (1986)-220839
PTL 2: JP-A-SHO62 (1987)-152847
PTL 3: JP-A-HEI1 (1989)-279949
PTL 4: JP-A-HEI3 (1991)-192140

SUMMARY

In PTL 1 to PTL 4, however, the EVOH is partly replaced with a resin other than the EVOH. Therefore, the proportions of the EVOH in the resin compositions are reduced, so that the resin compositions tend to be poorer in gas barrier properties attributable to the EVOH.

With the spread of internet shopping and the economic development of developing countries in recent years, article distribution has been rapidly globalized. Therefore, the transportation of foods, chemicals, and other articles tends to require longer transportation periods. Hence, there is a demand for an EVOH-based multilayer structure (package) excellent in gas barrier properties and impact resistance, i.e., having a higher resistance to fall and impact during longer-period transportation and handling.

In view of the foregoing, the present disclosure provides an EVOH resin composition excellent in impact resistance even without the resin other than the EVOH blended therein.

The inventor conducted intensive studies in view of the foregoing and, as a result, found that, where an EVOH resin composition contains an EVOH and an aliphatic carboxylic acid metal salt containing a metal moiety selected from the group consisting of Periodic Table 4th-period d-block metals and further contains a sorbic acid ester in a very small amount, the EVOH resin composition is excellent in impact resistance, and is less susceptible to odor emanation during film formation.

It is generally known that aliphatic carboxylic acid metal salts promote the thermal decomposition of the EVOH to reduce the impact resistance of the EVOH resin composition. Therefore, those skilled in the art generally refrain from blending such an aliphatic carboxylic acid metal salt with the EVOH when making attempts to improve the mechanical properties (impact resistance) of the EVOH. However, the inventor found that the EVOH resin composition containing the EVOH and the specific aliphatic carboxylic acid metal salt and further containing the very small amount of the sorbic acid ester is unexpectedly improved in mechanical properties (impact resistance), and is less susceptible to odor emanation during the film formation.

According to a first aspect of the present disclosure, there is provided an EVOH resin composition containing: (A) an EVOH; (B) an aliphatic carboxylic acid metal salt; and (C) a sorbic acid ester; wherein the aliphatic carboxylic acid metal salt (B) contains a metal moiety selected from the group consisting of long Periodic Table 4th-period d-block metals; wherein the sorbic acid ester (C) is present in an amount of 0.00001 to 10 ppm based on the total amount of the EVOH (A), the aliphatic carboxylic acid metal salt (B), and the sorbic acid ester (C). According to a second aspect of the present disclosure, a multilayer structure produced by using the EVOH resin composition according to the first aspect is provided. According to a third aspect of the present disclosure, a package formed from the multilayer structure according to the second aspect is provided.

The EVOH resin composition of the present disclosure contains the EVOH (A), the aliphatic carboxylic acid metal salt (B), and the sorbic acid ester (C). In the EVOH resin composition, the aliphatic carboxylic acid metal salt (B) contains the metal moiety selected from the group consisting of the long Periodic Table 4th-period d-block metals, and the amount of the sorbic acid ester (C) is 0.00001 to 10 ppm based on the total amount of the EVOH (A), the aliphatic carboxylic acid metal salt (B), and the sorbic acid ester (C). Therefore, a film formed from the EVOH resin composition is excellent in impact resistance even if a resin other than the EVOH is not blended in the EVOH resin composition. Further, the EVOH resin composition is less susceptible to odor emanation during the film formation.

Where the aliphatic carboxylic acid metal salt (B) is present in an amount of 1 to 500 ppm on a metal basis based on the total amount of the EVOH (A), the aliphatic carboxylic acid metal salt (B), and the sorbic acid ester (C) in the EVOH resin composition, the film formed from the EVOH resin composition is more excellent in impact resistance.

Where the ratio (B)/(C) of the weight of the aliphatic carboxylic acid metal salt (B) on a metal basis to the weight of the sorbic acid ester (C) is 5 to 20,000, the film formed from the EVOH resin composition is still more excellent in impact resistance.

The multilayer structure of the present disclosure, which includes a layer formed from the EVOH resin composition of the present disclosure, is excellent in impact resistance, and is less susceptible to odor emanation during production thereof. Therefore, the multilayer structure can be formed into packaging materials which are advantageously used for packaging foods, chemical agents, and agricultural chemicals.

DESCRIPTION OF EMBODIMENTS

Preferred embodiments of the present disclosure will hereinafter be described in detail. It should be understood that these preferred embodiments are illustrative.

An EVOH resin composition of the present disclosure contains: (A) an EVOH; (B) an aliphatic carboxylic acid metal salt; and (C) a sorbic acid ester. The respective components will hereinafter be described in turn.

<EVOH (A)>

The EVOH (A) to be used in the present disclosure is a water-insoluble thermoplastic resin which is typically prepared by copolymerizing ethylene and a vinyl ester monomer and then saponifying the resulting copolymer, and is known as an ethylene-vinyl alcohol copolymer or a saponified ethylene-vinyl acetate copolymer. A known polymerization method such as solution polymerization method, suspension polymerization method or emulsion polymerization method may be utilized for the polymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and further contains a small amount of a vinyl ester structural unit left unsaponified. In general, the EVOH is also referred to as saponified ethylene-vinyl ester copolymer.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have a carbon number of 3 to 20, more preferably 4 to 10, particularly preferably 4 to 7. These vinyl esters may be typically each used alone or, as required, a plurality of vinyl esters may be selected from these vinyl esters to be used in combination.

The ethylene structural unit content of the EVOH (A), which is measured in conformity with ISO14663, is typically 20 to 60 mol %, preferably 25 to 50 mol %, particularly preferably 25 to 35 mol %. If the ethylene structural unit content is excessively low, the high-humidity gas barrier property and the melt formability tend to be deteriorated. If the ethylene structural unit content is excessively high, on the other hand, the gas barrier property tends to be deteriorated.

The vinyl ester saponification degree of the EVOH (A), which is measured in conformity with JIS K6726 (with the use of a solution obtained by homogenously dissolving the EVOH in a water/methanol solvent), is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH (A) is excessively high, the film formability tends to be deteriorated. If the MFR of the EVOH (A) is excessively low, the melt extrusion tends to be difficult.

The EVOH (A) to be used in the present disclosure may contain a structural unit derived from any of the following comonomers in addition to the ethylene structural unit and the vinyl alcohol structural unit (including the unsaponified vinyl ester structural unit). For example, the comonomers include: α-olefins such as propylene, isobutene, α-octene, α-dodecene, and α-octadecene; hydroxyl-containing α-olefins such as 3-buten-1-ol, 4-penten-1-ol, and 3-butene-1,2-diol, and hydroxyl-containing α-olefin derivatives including esterification products and acylation products of these hydroxyl-containing α-olefins; hydroxymethyl vinylidene diacetates such as 1,3-diacetoxy-2-methylenepropane, 1,3-dipropionyloxy-2-methylenepropane, and 1,3-dibutyronyloxy-2-methylenepropane; unsaturated carboxylic acids, and salts, partial alkyl esters, full alkyl esters, nitriles, amides, and anhydrides of the unsaturated carboxylic acids; unsaturated sulfonic acids, and salts of the unsaturated sulfonic acids; vinylsilane compounds; vinyl chloride; and styrene. These comonomers may be used alone or in combination.

Post-modified EVOHs such as urethanized EVOH, acetalized EVOH, cyanoethylated EVOH, and oxyalkylenated EVOH may be used as the EVOH (A).

Of these modified EVOHs, an EVOH having a primary hydroxyl group introduced to its side chain by copolymerization is preferred because the secondary formability is improved in stretching process, vacuum pressure forming process, and the like. Particularly, an EVOH having a 1,2-diol structure in its side chain is preferred.

The EVOH (A) to be used in the present disclosure may be a mixture of different EVOHs. These EVOHs may have different ethylene structural unit contents, different saponification degrees, different melt flow rates (MFRs) (as measured at 210° C. with a load of 2160 g), and different modification degrees (e.g., different contents of the structural unit containing the primary hydroxyl group in the side chain), and contain different comonomer components.

<Aliphatic Carboxylic Acid Metal Salt (B)>

The EVOH resin composition of the present disclosure contains the aliphatic carboxylic acid metal salt (B) containing a metal moiety selected from the group consisting of long Periodic Table 4th-period d-block metals. The aliphatic carboxylic acid metal salt (B) typically has a carbon number of 3 to 30, preferably 4 to 20, particularly preferably 5 to 14. Where the carbon number of the aliphatic carboxylic acid metal salt (B) falls within the aforementioned ranges, the effects of the present disclosure tend to be more efficiently provided.

Specific examples of an aliphatic carboxylic acid for the anionic moiety of the aliphatic carboxylic acid metal salt (B) include: aliphatic monocarboxylic acids including saturated aliphatic monocarboxylic acids such as butyric acid, valeric acid, caproic acid, enanthic acid, caprylic acid, pelargonic acid, capric acid, lauric acid, myristic acid, pentadecylic acid, palmitic acid, margaric acid, stearic acid, arachidic acid, heneicosylic acid, behenic acid, lignoceric acid, montanic acid, melissic acid, tartronic acid, glyceric acid, hydroxybutyric acid, malic acid, tartaric acid, gluconic acid, mevalonic acid, and pantoic acid, and unsaturated aliphatic monocarboxylic acids such as linoleic acid, linolenic acid, pinolenic acid, eleostearic acid, isostearic acid, isononanoic acid, 2-ethylhexanoic acid, 2-heptylundecanoic acid, 2-octyldodecanoic acid, palmitoleic acid, sapienic acid, oleic acid, elaidic acid, vaccenic acid, gadoleic acid, eicosenoic acid, erucic acid, nervonic acid, and ricinoleic acid; aliphatic dicarboxylic acids including saturated aliphatic dicarboxylic acids such as succinic acid, adipic acid, pimelic acid, suberic acid, azelaic acid, and sebacic acid, and unsaturated aliphatic dicarboxylic acids such as eicosadienoic acid and docosadienoic acid; and aliphatic tricarboxylic acids including saturated aliphatic tricarboxylic acids such as citric acid, isocitric acid, and aconitic acid. Of these, tartronic acid, glyceric acid, hydroxybutyric acid, malic acid, tartaric acid, gluconic acid, citric acid, isocitric acid, mevalonic acid, pantoic acid, and ricinoleic acid are hydroxyl-containing aliphatic carboxylic acids. From the viewpoint of heat stability (for prevention of viscosity increase during melt forming, and occurrence of fisheyes), the aliphatic monocarboxylic acids containing one carboxyl group are preferred, and the saturated aliphatic monocarboxylic acids are more preferred. Particularly, caprylic acid, lauric acid, and stearic acid are preferred, and caprylic acid and stearic acid are especially preferred.

It is essential that the metal moiety (cationic moiety) of the aliphatic carboxylic acid metal salt (B) is a metal selected from the group consisting of the long Periodic Table 4th-period d-block metals. Examples of the long Periodic Table 4th-period d-block metals include scandium, titanium, vanadium, chromium, manganese, iron, cobalt, nickel, copper, and zinc. Of these, nickel, copper, and zinc are preferred, and zinc is particularly preferred because it is highly effective, less expensive, and easily available.

The aliphatic carboxylic acid metal salt (B) is preferably a saturated aliphatic monocarboxylic acid salt having a carbon number of 3 to 30 and containing a metal moiety selected from the group consisting of the long Periodic Table 4th-period d-block metals. More preferably, the aliphatic carboxylic acid metal salt (B) is a saturated aliphatic monocarboxylic acid salt having a carbon number of 3 to 30 and containing a metal moiety selected from the group consisting of nickel, copper, and zinc.

The aliphatic carboxylic acid metal salts described above may be used alone or in combination as the aliphatic carboxylic acid metal salt (B).

A reason why excellent effects are provided by using the aliphatic carboxylic acid metal salt (B) is not definitively known, but it is supposed that, where the metal moiety of the aliphatic carboxylic acid metal salt (B) is the metal selected from the group consisting of the long Periodic Table 4th-period d-block metals, excessive thermal decomposition which may otherwise deteriorate the mechanical properties (impact resistance) is moderately suppressed, and high-dimensional structures (e.g., molecular orientation and crystalline structure) to be formed during multilayer coextrusion of the EVOH resin composition can be made highly uniform and, as a result, the mechanical properties (impact resistance) are improved.

The amount of the aliphatic carboxylic acid metal salt (B) is typically 1 to 500 ppm, preferably 3 to 300 ppm, particularly preferably 4 to 200 ppm, especially preferably 5 to 150 ppm, on a metal basis based on the total amount of the EVOH (A), the aliphatic carboxylic acid metal salt (B), and the sorbic acid ester (C). If the amount of the aliphatic carboxylic acid metal salt (B) is excessively small, the effects of the present disclosure tend to be insufficient. If the amount of the aliphatic carboxylic acid metal salt (B) is excessively great, the heat stability is liable to be deteriorated. Where two or more aliphatic carboxylic acid metal salts are used as the aliphatic carboxylic acid metal salt (B), the amount of the aliphatic carboxylic acid metal salt (B) on a metal basis is the total amount of long Periodic Table 4th-period d-block metals contained in the two or more aliphatic carboxylic acid metal salts.

The amount of the aliphatic carboxylic acid metal salt (B) on a metal basis may be measured, for example, by the following method.

A dry sample is precisely weighed, put in a platinum evaporating dish having a known weight, and carbonized by an electric heater. Then, the sample is burned with heating by a gas burner until no smoke is observed. The platinum evaporating dish containing the resulting sample is put in an electric oven, and the sample is fully ashed at an elevated temperature. The resulting ash is cooled, and then hydrochloric acid and purified water are poured over the ash, which is in turn dissolved in the acid solution with heating by the electric heater. The resulting solution is poured in a measuring flask, and diluted with purified water to a predetermined volume, whereby a sample solution for atomic absorption spectrometry is prepared. The amount of the metal contained in the sample solution is measured by the atomic absorption spectrometry, whereby the amount of the aliphatic carboxylic acid metal salt (B) on a metal basis is determined.

<Sorbic Acid Ester (C)>

The EVOH resin composition of the present disclosure contains a very small amount of the sorbic acid ester (C) in addition to the aliphatic carboxylic acid metal salt (B).

In the present disclosure, a sorbic acid ester prepared by condensation of sorbic acid and an alcohol or a phenol derivative, for example, is usable as the sorbic acid ester (C). Specific examples of the sorbic acid ester include alkyl sorbates such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of an alcohol resulting from hydrolysis of the sorbic acid ester (C) is relatively low, the resin is less susceptible to coloration. Therefore, the alkyl sorbates are preferred, and alkyl sorbates containing a C1 to C5 alkoxy group are more preferred. Alkyl sorbates containing a C1 to C3 alkoxy group are particularly preferred, and methyl sorbate is most preferred.

The sorbic acid ester (C) typically has a molecular weight of 120 to 220, preferably 120 to 200, particularly preferably 120 to 160. Where the molecular weight of the sorbic acid ester (C) falls within the aforementioned ranges, a coloration suppressing effect tends to be efficiently provided.

The amount of the sorbic acid ester (C) contained in the EVOH resin composition is 0.00001 to 10 ppm, preferably 0.00005 to 5 ppm, more preferably 0.0001 to 4 ppm, particularly preferably 0.0005 to 3 ppm, especially preferably 0.001 to 1 ppm, based on the total amount of the EVOH (A), the aliphatic carboxylic acid metal salt (B), and the sorbic acid ester (C). Where the amount of the sorbic acid ester (C) falls within the aforementioned ranges, the EVOH resin composition is efficiently provided, which is excellent in impact resistance and less susceptible to odor emanation during the forming.

As described above, it is generally known that, where the aliphatic carboxylic acid metal salt is blended with the EVOH (A), the resulting EVOH resin composition tends to be poorer in impact resistance.

The inventor found that, where an aliphatic carboxylic acid metal salt containing a long Periodic Table 4th-period d-block metal (aliphatic carboxylic acid metal salt (B)) is blended with the EVOH, the impact resistance is improved. However, the impact resistance improving effect is insufficient with the use of the aliphatic carboxylic acid metal salt (B) alone. This is supposedly because the aliphatic carboxylic acid metal salt (B) per se has insufficient heat stability and fails to provide a sufficient impact resistance improving effect. In the present disclosure, in contrast, the aliphatic carboxylic acid metal salt (B) is used in combination with the very small amount of the sorbic acid ester (C). This improves the heat stability of the aliphatic carboxylic acid metal salt (B), thereby providing a more excellent impact resistance improving effect. A reason why the excellent effect is provided by using the aliphatic carboxylic acid metal salt (B) in combination with the very small amount of the sorbic acid ester (C) is that the sorbic acid ester (C) has a lower polarity and, therefore, can be homogeneously dispersed in the resin. During the melt forming, the sorbic acid ester (C) is decomposed with a very small amount of water to generate sorbic acid, which interacts with the aliphatic carboxylic acid metal salt (B). The aliphatic carboxylic acid metal salt (B) is supposedly present in the form of a metal cluster complex. The complex supposedly has an energy state stabilized with its outer portion covered with a carbonyl structure attributable to the aliphatic carboxylic acid. With the energy state of the aliphatic carboxylic acid metal salt (B) thus stabilized, the resin composition is supposedly improved in impact resistance.

The ratio (B)/(C) of the weight of the aliphatic carboxylic acid metal salt (B) on a metal basis to the weight of the sorbic acid ester (C) is typically 5 to 20,000, preferably 25 to 15,000, particularly preferably 50 to 12,000, especially preferably 500 to 10,000. Where the ratio (B)/(C) falls within the aforementioned ranges, the effects of the present disclosure tend to be noticeably provided.

In the case of pellets and other products formed from the EVOH resin composition of the present disclosure, the amount of the sorbic acid ester (C) contained in the EVOH resin composition can be measured by the following method. A sample is first prepared by pulverizing the formed product (e.g., the pellets) by a given method (e.g., a freeze-pulverizing method), and dissolving the pulverized product in a C1 to C5 lower alcohol solvent. Then, the sample is analyzed by a liquid chromatography/mass spectrometry (LC/MS/MS) method, whereby the amount of the sorbic acid ester (C) is determined.

In the case of a formed product containing the EVOH resin composition and some other thermoplastic resin or the like (e.g., a multilayer structure), a layer of the EVOH resin composition to be analyzed is taken out of the multilayer structure by a given method, and the measurement is performed in the aforementioned manner.

<Other Thermoplastic Resin>

A film formed from the EVOH resin composition of the present disclosure is excellent in impact resistance even if a resin other than the EVOH (A) is not blended in the EVOH resin composition. For further improvement of the impact resistance and other properties, the EVOH resin composition may contain some other thermoplastic resin typically in an amount of not greater than 30 wt. % based on the weight of the EVOH (A).

Examples of the other thermoplastic resin include: olefin homopolymers and copolymers such as linear low-density polyethylenes, low-density polyethylenes, medium-density polyethylenes, high-density polyethylenes, ionomers, ethylene-propylene copolymers, polypropylenes, polybutenes, and polypentenes; polycycloolefins; polyolefin resins in a broader sense including unsaturated carboxyl-modified polyolefin resins obtained by graft-modifying any of the aforementioned olefin homopolymers and copolymers with an unsaturated carboxylic acid or an unsaturated carboxylic acid ester; polystyrene resins, polyesters, polyamides, copolymerized polyamides, polyvinyl chlorides, polyvinylidene chlorides, acrylic resins, vinyl ester resins, chlorinated polyethylenes, and chlorinated polypropylenes, which may be used alone or in combination.

Particularly, where a multilayer structure is produced by using the EVOH resin composition of the present disclosure for use as a food package, it is preferred to blend a polyamide resin in the EVOH resin composition in order to prevent an EVOH layer from leaching from an edge of the package after hot water treatment of the package. The polyamide resin is capable of forming a network structure with its amide bonds interacting with OH groups and/or ester groups of the EVOH, thereby preventing the leaching of the EVOH during the hot water treatment. Therefore, where the EVOH resin composition of the present disclosure is used for a package for retort food or boilable food, it is preferred to blend the polyamide resin in the EVOH resin composition.

Known polyamide resins are usable as the polyamide resin.

Specific examples of the polyamide resins include: polyamide homopolymers such as polycapramide (nylon 6), poly-ω-aminoheptanoic acid (nylon 7), poly-ω-aminononanoic acid (nylon 9), polyundecanamide (nylon 11), and polylauryllactam (nylon 12); polyamide copolymer resins including aliphatic polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), ethylenediamine adipamide/hexamethylenediammonium adipate copolymers (nylon 26/66), caprolactam/hexamethylenediammonium adipate/hexamethylenediammonium sebacate copolymers (nylon 66/610), and ethyleneammonium adipate/hexamethylenediammonium adipate/hexamethylenediammonium sebacate copolymers (nylon 6/66/610), and aromatic polyamides such as polyhexamethylene isophthalamide, polyhexamethylene terephthalamide, poly-m-xylene adipamide, hexamethylene isophthalamide/terephthalamide copolymers, poly-p-phenylene terephthalamide, and poly-p-phenylene/3,4'-diphenyl ether terephthalamide; amorphous polyamides, polyamide resins obtained by modifying any of these polyamide resins with an aromatic amine such as methylenebenzylamine or m-xylenediamine, m-xylylenediammonium adipate, and terminal-modified polyamide resins obtained by terminal-modifying any of these polyamide resins. Particularly, the terminal-modified polyamide resins are preferred. These polyamide resins may be used alone or in combination.

<Other Additives>

The EVOH resin composition of the present disclosure may contain additives which are generally blended with the EVOH in amounts that do not impair the effects of the present disclosure (e.g., typically not greater than 10 wt. %, preferably not greater than 5 wt. %, based on the weight of the EVOH resin composition). Examples of the additives include heat stabilizer, antioxidant, antistatic agent, colorant, UV absorber, lubricant, plasticizer, light stabilizer, surfactant, antibacterial agent, drying agent, antiblocking agent, flame retardant, crosslinking agent, foaming agent, crystal nucleating agent, antifogging agent, biodegradation agent, silane coupling agent, oxygen absorber, and inorganic filler, which may be used alone or in combination.

Examples of the heat stabilizer to be used for improving the heat stability and other physical properties during the melt forming include organic acids such as acetic acid, propionic acid, butyric acid, lauric acid, stearic acid, oleic acid, and behenic acid, and alkali earth metal salts (calcium salts, magnesium salts, and the like) of these organic acids. These may be used alone or in combination.

<EVOH Resin Composition Production Method>

A method of producing the EVOH resin composition of the present disclosure is not particularly limited, but the following exemplary methods (I) to (IV) may be employed:
(I) a dry-blending method including the step of dry-blending at least one selected from the group consisting of the aliphatic carboxylic acid metal salt (B) and the sorbic acid ester (C) in a predetermined proportion with pellets of the EVOH (A);
(II) an immersion method including the steps of immersing pellets of the EVOH (A) in a solution containing at least one selected from the group consisting of the aliphatic carboxylic acid metal salt (B) and the sorbic acid ester (C), and drying the resulting pellets;
(III) a melt-kneading method including the steps of melt-kneading the EVOH (A), blending at least one selected from the group consisting of the aliphatic carboxylic acid metal salt (B) and the sorbic acid ester (C) with the EVOH (A) during the melt-kneading, and forming the resulting melt mixture into pellets; and
(IV) a solution mixing method including the steps of mixing at least one selected from the group consisting of the aliphatic carboxylic acid metal salt (B) and the sorbic acid ester (C) with a solution containing the EVOH (A), and removing a solvent from the resulting solution.

A plurality of methods may be selected from these methods to be used in combination.

Of these methods, a method (dry-blending method) in which EVOH resin composition pellets are produced by mixing a predetermined proportion of the sorbic acid ester (C) with the solution containing the EVOH (A), and removing the solvent from the resulting solution in the method (IV), and then the aliphatic carboxylic acid metal salt (B) is dry-blended with the EVOH resin composition pellets in the method (I), and a method (dry-blending method) in which the aliphatic carboxylic acid metal salt (B) and the sorbic acid ester (C) are dry-blended in predetermined proportions with the pellets of the EVOH (A) in the method (I) are industrially preferred because these methods are practical in terms of productivity and economy. The EVOH resin composition containing any of the aforementioned additives may be produced by blending the additives by substantially the same methods as the methods (I) to (IV).

A known mixing apparatus such as rocking mixer, ribbon blender, or line mixer may be used for the dry blending in the method (I).

For the dry blending in the method (I), the water content of the pellets of the EVOH (A) is preferably adjusted to 0.1 to 5 wt. %, more preferably 0.5 to 4 wt. %, particularly preferably 1 to 3 wt. %, in order to improve the adhesion of the at least one selected from the group consisting of the aliphatic carboxylic acid metal salt (B) and the sorbic acid ester (C) to the pellets of the EVOH (A). If the water content is excessively low, the at least one selected from the group consisting of the aliphatic carboxylic acid metal salt (B) and the sorbic acid ester (C) is liable to be detached from the pellets of the EVOH (A) to be thereby unevenly distributed over the pellets of the EVOH (A). If the water content is excessively high, on the other hand, the at least one selected from the group consisting of the aliphatic carboxylic acid metal salt (B) and the sorbic acid ester (C) is liable to agglomerate to be thereby unevenly distributed over the pellets of the EVOH (A).

The water content of the pellets of the EVOH (A) is herein measured and calculated in the following manner.

[Water Content Measuring Method]

The weight (W1) of a sample of the pellets of the EVOH (A) is measured at a room temperature (25° C.) by an electronic balance before drying, and then the sample is dried at 150° C. for 5 hours in a hot air dryer. After the drying, the sample is cooled in a desiccator for 30 minutes. After the temperature of the sample of the pellets of the EVOH (A) is returned to the room temperature, the weight (W2) of the sample is measured. The water content of the pellets of the EVOH (A) is calculated from the following expression:

$$\text{Water content (\%)}=[(W1-W2)/W1]\times 100$$

In the methods (I) and (II), the pellets of the EVOH (A) with the aliphatic carboxylic acid metal salt (B) and the sorbic acid ester (C) adhering to outer surfaces thereof are produced.

A known melt-kneading apparatus such as kneader, extruder, mixing roll, Banbury mixer, or Plast mill may be used for the melt kneading in the method (III). The melt kneading is typically performed at 150° C. to 300° C., preferably 180° C. to 280° C., for about 1 to about 20 minutes. Particularly, a single-screw or twin-screw extruder is industrially advantageous in that the pellets can be easily produced. As required, the extruder is preferably provided with vent suction device, gear pump device, screen device, and/or the like. Particularly, the extruder may be provided with one or more vent holes to reduce the pressure by suction for removal of water and byproducts (thermally decomposed low-molecular-weight substances, and the like), or an inert gas such as nitrogen may be continuously fed into a hopper for prevention of intrusion of oxygen into the extruder. Thus, the EVOH resin composition has a higher quality with the heat coloration and the thermal degradation suppressed.

The method for feeding the ingredients into the melt-kneading apparatus such as the extruder is not particularly limited. Exemplary methods for the feeding include:
(1) a method including the steps of dry-blending at least one selected from the group consisting of the aliphatic carboxylic acid metal salt (B) and the sorbic acid ester (C) with the EVOH (A), and feeding the resulting blend into the extruder;
(2) a solid side-feeding method including the steps of feeding and melting the EVOH (A) in the extruder, and feeding at least one selected from the group consisting of the aliphatic carboxylic acid metal salt (B) and the sorbic acid ester (C) in a solid state into the melted EVOH (A); and (3) a melt side-feeding method including the steps of feeding and melting the EVOH (A) in the extruder, and feeding at least one selected from the group consisting of the aliphatic carboxylic acid metal salt (B) and the sorbic acid ester (C) in a melted state into the melted EVOH (A). Particularly, the method (1) is practical because of the simplicity of the apparatus and the costs of the blend.

A known method may be used for the formation of the pellets after the melt kneading. Examples of the method include strand cutting method, and hot cutting method (in-air cutting method and underwater cutting method). The strand cutting method is preferred in terms of industrial productivity.

A known good solvent for the EVOH may be used as the solvent in the solution mixing method. Typical examples of the solvent include mixed solvents containing water and C1 to C4 aliphatic alcohols. Mixed solvents containing water and methanol are preferred. The EVOH (A) may be dissolved at any desired concentration in the solvent with heating and/or pressurization as required. For example, at least one selected from the group consisting of the aliphatic carboxylic acid metal salt (B) and the sorbic acid ester (C) may be blended with a solution or a paste of the EVOH (A). In this case, the aliphatic carboxylic acid metal salt (B) and the sorbic acid ester (C) to be blended may be in solid state, solution state, or dispersion state. After the blending, the EVOH resin composition solution or paste containing the aforementioned components homogeneously dispersed therein is formed into pellets by any of the aforementioned known methods. In terms of industrial productivity, the underwater cutting method is preferred. The pellets thus formed are dried by a known method.

The pellets may each have any desired shape, for example, spherical shape, oval shape, cylindrical shape, cubic shape, square prism shape, or the like, and typically the oval shape or the cylindrical shape. For easy handling of the pellets in the subsequent use as a forming material, the cylindrical pellets typically each have a bottom diameter of 1 to 6 mm and a length of 1 to 6 mm, preferably a bottom diameter of 2 to 5 mm and a length of 2 to 5 mm. In the case of the oval pellets, the major diameter is typically 1.5 to 30 mm, preferably 3 to 20 mm, more preferably 3.5 to 10 mm, and the minor diameter is typically 1 to 10 mm, preferably 2 to 6 mm, particularly preferably 2.5 to 5.5 mm. In an exemplary method for determination of the major diameter and the minor diameter, a pellet is observed on a hand, and the major diameter of the pellet is measured by means of a measuring instrument such as a caliper. Then, a maximum sectional plane orthogonal to the major diameter is visually and tactually identified, and the minor diameter of the maximum sectional plane is measured in the aforementioned manner.

Thus, the EVOH resin composition of the present disclosure is provided.

<Multilayer Structure>

A multilayer structure of the present disclosure includes at least one layer formed from the EVOH resin composition of the present disclosure. The layer formed from the EVOH resin composition of the present disclosure (hereinafter referred to simply as "resin composition layer") may be laminated with some other base material to be thereby imparted with higher strength and additional functions.

A thermoplastic resin other than the EVOH (hereinafter referred to as "other base resin") is preferably used as the base material.

Examples of the other base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-$\alpha$-olefin (C4 to C20 $\alpha$-olefin) copolymers, polypropylene resins such as polypropylenes and propylene-$\alpha$-olefin (C4 to C20 $\alpha$-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, halogenated polyolefins such as chlorinated polyethylenes and chlorinated polypropylenes, and aromatic and aliphatic polyketones. These may be used alone or in combination.

In consideration of the hydrophobicity, the polyamide resins, the polyolefin resins, the polyester resins, and the polystyrene resins, which are hydrophobic resins, are preferred out of the aforementioned resins, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferred.

Where resin composition layers a (a1, a2, . . . ) and other base resin layers b (b1, b2, . . . ) are laminated together to produce the multilayer structure of the present disclosure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like.

In the aforementioned layered configuration, as required, an adhesive resin layer may be provided between the layers. Where the other base resin layer (i.e., the layer of the thermoplastic resin other than the EVOH) is provided on at least one side of the resin composition layer with the adhesive resin layer provided therebetween in the multilayer structure, the effects of the present disclosure tend to be more efficiently provided.

Where the multilayer structure further includes a recycle layer R formed from a mixture obtained by re-melting cutoff pieces and defective products occurring during the production of the multilayer structure and containing the resin composition of the present disclosure and the other base resin, possible combinations of the layers for the layered configuration include b/R/a, b/R/a/b, b/R/a/R/b, b/a/R/a/b, b/R/a/R/a/R/b, and the like. The total number of the layers of the multilayer structure of the present disclosure is typically 2 to 15, preferably 3 to 10.

The layered configuration of the multilayer structure of the present disclosure preferably includes, as a structural unit, at least a basic unit including a resin composition layer as an intermediate layer and other base resin layers provided on opposite outer sides of the intermediate layer (b/a/b, or b/adhesive resin layer/a/adhesive resin layer/b).

A known adhesive resin may be used as an adhesive resin layer forming material. The adhesive resin may be properly selected according to the type of the thermoplastic resin to be used for the other base resin layers. The adhesive resin is typically a carboxyl-containing modified polyolefin polymer prepared by chemically bonding an unsaturated carboxylic acid or its anhydride to a polyolefin resin by an addition reaction, a graft reaction or the like. Examples of the carboxyl-containing modified polyolefin polymer include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride, which may be used alone or in combination.

In this case, the amount of the unsaturated carboxylic acid or its anhydride contained in the carboxyl-containing modified polyolefin polymer is typically 0.001 to 3 wt. %, preferably 0.01 to 1 wt. %, particularly preferably 0.03 to 0.5 wt. %. If the modification degree of the modification product is low, the adhesiveness tends to be insufficient. If the modification degree is excessively high, a crosslinking reaction tends to occur, thereby deteriorating the formability.

The EVOH (A), another EVOH, a rubber/elastomer component such as polyisobutylene or ethylene-propylene rubber, and/or a resin for the polyolefin resin layer may be blended with the adhesive resin. Particularly, a polyolefin resin different from the base polyolefin resin for the adhesive resin may be blended with the adhesive resin.

The other base resin and the adhesive resin layer may each contain the aliphatic carboxylic acid metal salt (B) and the sorbic acid ester (C) to be used in the present disclosure as well as a conventionally known additive in an amount that does not impair the effects of the present disclosure (e.g., in an amount of not greater than 30 wt. %, preferably not greater than 10 wt. %). Examples of the additive include plasticizer (ethylene glycol, glycerin, hexanediol or the like), filler, clay (montmorillonite or the like), colorant, antioxidant, antistatic agent, lubricant (e.g., C10 to C30 higher fatty acid, alkali earth metal salt of higher fatty acid, ester of higher fatty acid (methyl ester, isopropyl ester, butyl ester, octyl ester or the like of higher fatty acid), higher fatty acid amide (saturated fatty acid amide such as stearamide or behenamide, unsaturated fatty acid amide such as oleamide or erucamide, or bis-fatty acid amide such as ethylene bis-stearamide, ethylene bis-oleamide, ethylene bis-erucamide or ethylene bis-lauramide), low-molecular weight polyolefin (e.g., low-molecular weight polyethylene or low-molecular weight polypropylene having a molecular weight of about 500 to about 10,000), or fluorinated ethylene resin), nucleating agent, antiblocking agent, UV absorber, and wax. These may be used alone or in combination. Particularly, where the adhesive resin layer adjacent to the resin composition layer in the multilayer structure of the present disclosure contains the aliphatic carboxylic acid metal salt (B) and the sorbic acid ester (C), the multilayer structure is more excellent in impact resistance.

For production of the multilayer structure, the resin composition layer formed from the EVOH resin composition of the present disclosure and the other base resin layer may be laminated together (optionally with the adhesive resin layer provided therebetween) by a known laminating method. Examples of the laminating method include: a method in which a film or a sheet of the resin composition of the present disclosure is laminated with the other base resin by melt extrusion; a method in which the other base resin layer is laminated with the resin composition of the present disclosure by melt extrusion; a method in which the resin composition of the present disclosure and the other base resin are coextruded; a method in which a film (layer) of the resin composition of the present disclosure and the other base resin layer are separately formed and then dry-laminated together with the use of a known adhesive agent such as of organic titanium compound, isocyanate compound, polyester compound or polyurethane compound; and a method in which a solution of the EVOH resin composition of the present disclosure is applied on the other base resin layer, and a solvent is removed from the applied solution. Of these methods, the coextrusion method is preferred from the viewpoint of costs and environmental concerns.

The multilayer structure described above may be used as it is to be formed into various shapes, but may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat-setting process to ensure dimensional stability after the stretching. The heat-setting process may be performed in a well-known manner. For example, the stretched multilayer structure (stretched film) is typically heat-treated at 80° C. to 180° C., preferably 100° C. to 165° C., for about 2 to about 600 seconds, while being kept tense.

Where the stretched multilayer film produced by using the EVOH resin composition of the present disclosure is used as a shrinkable film, the stretched film may be cold-set so as to be imparted with a heat-shrinkable property, for example, by applying cold air over the stretched film without performing the above heat-setting process.

Further, a cup-shaped or tray-shaped multilayer container may be produced from the multilayer structure of the present disclosure. For the production of the multilayer container, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the multilayer structure of the present disclosure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) of the present disclosure and the thicknesses of the resin composition layer, the other base resin layer, and the adhesive resin layer of the multilayer structure vary depending upon the layered configuration, the type of the base resin, the type of the adhesive resin, and the use purpose, the package shape, the required physical properties, and the like of the multilayer structure. Where the resin composition layer, the adhesive resin layer, and/or the other base resin layer each include two or more layers, the following thickness values are each defined as the total thickness of the layers of the same type.

The thickness of the multilayer structure (or the stretched multilayer structure) of the present disclosure is typically 10 to 5,000 μm, preferably 30 to 3,000 μm, particularly preferably 50 to 2,000 μm. If the thickness of the overall multilayer structure is excessively small, the gas barrier properties tend to be deteriorated. If the thickness of the overall multilayer structure is excessively great, the gas barrier properties are excessive, and materials for the multilayer structure are unnecessarily required. This is not economically preferred. The thickness of the resin composition layer of the multilayer structure is typically 1 to 500 μm, preferably 3 to 300 μm, particularly preferably 5 to 200 μm. The thickness of the other base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the resin composition layer and the other base resin layer of the multilayer structure (resin composition layer/other base resin layer) (if these layers each include a plurality of layers, the thickness ratio between the thickest one of the resin composition layers and the thickest one of the other base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film or the stretched film formed in the aforementioned manner are useful as packaging material containers for general foods, condiments such as mayonnaise and dressing, fermented foods such as miso, fat and oil such as salad oil, beverages, cosmetics, and pharmaceutical products.

EXAMPLES

The embodiments of the present disclosure will hereinafter be described more specifically by way of examples thereof. However, it should be understood that the present disclosure be not limited to the examples within the scope of the present disclosure. In the following examples, "%" and "ppm" is based on weight, unless otherwise specified.

Example 1

[Production of EVOH Resin Composition]

Pellets of an ethylene-vinyl alcohol copolymer (a1) (having an ethylene structural unit content of 38 mol %, and an MFR of 3.7 g/10 minutes (as measured at 210° C. with a load of 2160 g) were used as the EVOH (A). Zinc stearate (b1) was used as the aliphatic carboxylic acid metal salt (B), and methyl sorbate (c1) was used as the sorbic acid ester (C). An EVOH resin composition of Example 1 was produced by dry-blending together the ethylene-vinyl alcohol copolymer (a1), 45 ppm of zinc stearate (b1) on a metal basis based on the total amount of the ethylene-vinyl alcohol copolymer (a1), zinc stearate (b1), and methyl sorbate (c1), and 0.005 ppm of methyl sorbate (c1) based on the total amount of the ethylene-vinyl alcohol copolymer (a1), zinc stearate (b1), and methyl sorbate (c1).

[Production of Multilayer Structure]

The EVOH resin composition produced in the aforementioned manner, a linear low-density polyethylene (LLDPE) (UF240 available from Japan Polyethylene Corporation, and having an MFR of 2.1 g/10 minutes (as measured at 190° C. with a load of 2160 g)), and an adhesive resin (PLEXAR PX3236 available from LyondellBasell LLC., and having an MFR of 2.0 g/10 minutes (as measured at 190° C. with a load of 2160 g)) were fed into a 3-type 5-layer multilayer coextrusion cast film forming apparatus, and a 3-type 5-layer multilayer structure (film) of LLDPE layer/adhesive resin layer/EVOH resin composition layer/adhesive resin layer/LLDPE layer was produced under the following conditions by a multilayer coextrusion method. The thicknesses (μm) of the respective layers of the multilayer structure were 37.5/5/15/5/37.5. The die temperatures of the forming apparatus were all set at 210° C.

(Conditions for Multilayer Coextrusion)

Intermediate layer extruder (for EVOH resin composition): a 40-mm diameter single screw extruder (having a barrel temperature of 210° C.)

Upper and lower layer extruders (for LLDPE): 40-mm diameter single screw extruders (each having a barrel temperature of 210° C.)

Middle upper and lower layer extruders (for adhesive resin): 32-mm diameter single screw extruders (each having a barrel temperature of 210° C.)

Die: a 3-type 5-layer feed block T-die (having a die temperature of 210° C.)

Take-up speed: 14 m/minute

Roll temperature: 50° C.

<Odor Emanation Evaluation>

First, 10 g of the EVOH resin composition produced in the aforementioned manner was put on an aluminum dish, and then heated to 210° C. which was the same temperature as employed for the production of the multilayer structure. At this time, the EVOH resin composition was evaluated for odor emanation based on the following criteria:

A: No odor emanation was observed.

B: Slight odor emanation was observed.

C: Obvious odor emanation was observed.

D: Strong odor emanation was observed, making it impossible to continue work operation <Impact Strength Evaluation>

The impact strength (kgf·cm) of the multilayer structure produced in the aforementioned manner was measured in a 23° C. and 50% RH atmosphere by means of a YSS type film impact tester (MODEL 181 available from Yasuda Seiki Seisakusho, Ltd.) The measurement was performed five times, and the impact strength values thus measured were averaged. The multilayer structure was evaluated for the impact strength based on the impact strength average.

The film impact tester had a clamp inner diameter of 60 mm, an impact ball radius of 12.7 mm, and a pendulum lift angle of 90 degrees.

<Gas Barrier Property Evaluation>

The multilayer structure produced in the aforementioned manner was evaluated for gas barrier property at 20° C. at 65% RH by means of an oxygen gas permeability measuring apparatus (OX-TRAN 2/21 available from MOCON Inc.) The result is shown in Table 1.

Example 2

An EVOH resin composition and a multilayer structure were produced in substantially the same manner as in Example 1, except that the amount of methyl sorbate (c1) was 0.5 ppm based on the total amount of the ethylene-vinyl alcohol copolymer (a1), zinc stearate (b1), and methyl sorbate (c1). The EVOH resin composition and the multilayer structure thus produced were evaluated in the same manner as in Example 1.

Example 3

An EVOH resin composition and a multilayer structure were produced in substantially the same manner as in Example 1, except that zinc caprylate (b2) was used instead of zinc stearate (b1). The EVOH resin composition and the multilayer structure thus produced were evaluated in the same manner as in Example 1.

Example 4

An EVOH resin composition and a multilayer structure were produced in substantially the same manner as in Example 2, except that zinc caprylate (b2) was used instead of zinc stearate (b1). The EVOH resin composition and the multilayer structure thus produced were evaluated in the same manner as in Example 1.

Comparative Example 1

An EVOH resin composition and a multilayer structure were produced in substantially the same manner as in Example 1, except that methyl sorbate (c1) was not used. The EVOH resin composition and the multilayer structure thus produced were evaluated in the same manner as in Example 1.

Comparative Example 2

An EVOH resin composition and a multilayer structure were produced in substantially the same manner as in Example 3, except that methyl sorbate (c1) was not used. The EVOH resin composition and the multilayer structure thus produced were evaluated in the same manner as in Example 1.

Comparative Example 3

An EVOH resin composition and a multilayer structure were produced in substantially the same manner as in Example 1, except that zinc stearate (b1) was not used. The EVOH resin composition and the multilayer structure thus produced were evaluated in the same manner as in Example 1.

Comparative Example 4

An EVOH resin composition and a multilayer structure were produced in substantially the same manner as in Example 1, except that sodium stearate (b3) was used instead of zinc stearate (b1). The EVOH resin composition and the multilayer structure thus produced were evaluated in the same manner as in Example 1.

Comparative Example 5

An EVOH resin composition and a multilayer structure were produced in substantially the same manner as in Example 1, except that the amount of methyl sorbate (c1) was 15 ppm based on the total amount of the ethylene-vinyl alcohol copolymer (a1), zinc stearate (b1), and methyl sorbate (c1). The EVOH resin composition and the multilayer structure thus produced were evaluated in the same manner as in Example 1.

Comparative Example 6

An EVOH resin composition was produced in substantially the same manner as in Example 1, except that the amount of methyl sorbate (c1) was 30 ppm based on the total amount of the ethylene-vinyl alcohol copolymer (a1), zinc stearate (b1), and methyl sorbate (c1). An attempt was made to produce a multilayer structure by using the EVOH resin composition thus produced, but the production of the multilayer structure was impossible due to strong odor emanation. The EVOH resin composition was evaluated in the same manner as in Example 1.

The formulations of the EVOH resin compositions produced in the aforementioned manner, and the evaluation results obtained in the aforementioned manner are shown below in Table 1.

TABLE 1

|  | Example 1 | Example 2 | Example 3 | Example 4 | Comparative Example 1 |
|---|---|---|---|---|---|
| Aliphatic carboxylic acid metal salt (B) | Zinc stearate | Zinc stearate | Zinc caprylate | Zinc caprylate | Zinc stearate |
| Amount (ppm) of aliphatic carboxylic acid metal salt (B) on metal basis | 45 | 45 | 45 | 45 | 45 |
| Amount (ppm) of sorbic acid ester (C) | 0.005 | 0.5 | 0.005 | 0.5 | — |
| (B)/(C) | 9,000 | 90 | 9,000 | 90 | — |
| Odor emanation evaluation | A | A | A | A | A |
| Impact strength (kgf · cm) | 17.8 | 17.7 | 19.7 | 19.1 | 16.1 |
| Gas barrier property (cc · 20 μm/m² · day · atm) | 0.7 | 0.7 | 0.7 | 0.7 | 0.7 |

|  | Comparative Example 2 | Comparative Example 3 | Comparative Example 4 | Comparative Example 5 | Comparative Example 6 |
|---|---|---|---|---|---|
| Aliphatic carboxylic acid metal salt (B) | Zinc caprylate | — | (Sodium stearate) | Zinc stearate | Zinc stearate |
| Amount (ppm) of aliphatic carboxylic acid metal salt (B) on metal basis | 45 | — | (45) | 45 | 45 |

TABLE 1-continued

| | | | | | |
|---|---|---|---|---|---|
| Amount (ppm) of sorbic acid ester (C) | — | 0.005 | 0.005 | 15 | 30 |
| (B)/(C) | — | — | (9,000) | 3 | 1.5 |
| Odor emanation evaluation | A | A | A | C | D |
| Impact strength (kgf · cm) | 16.4 | 14.1 | 15.1 | 15.4 | * |
| Gas barrier property (cc · 20 μm/m² · day · atm) | 0.7 | 0.7 | 0.7 | 0.7 | |

* The production of the multilayer structure was impossible due to strong odor emanation.

The EVOH resin composition of Comparative Example 3 not containing the aliphatic carboxylic acid metal salt (B) and containing the sorbic acid ester (C) had a lower impact strength than the EVOH resin compositions of Comparative Examples 1 and 2 containing the aliphatic carboxylic acid metal salt (B) and not containing the sorbic acid ester (C). In contrast, the EVOH resin compositions of Examples containing the aliphatic carboxylic acid metal salt (B) and the sorbic acid ester (C) were significantly more excellent in impact strength than the EVOH resin compositions of Comparative Examples 1 to 3, and were excellent in gas barrier property without deterioration. Further, the EVOH resin composition of Comparative Example 5 in which the amount of the sorbic acid ester (C) was greater than the range specified in the present disclosure had a lower impact strength, and suffered from obvious odor emanation.

The EVOH resin composition of Comparative Example 4 containing sodium stearate instead of the aliphatic carboxylic acid metal salt (B) needed improvement in impact strength although containing the sorbic acid ester (C).

The EVOH resin composition of Comparative Example 6 in which the amount of the sorbic acid ester (C) was 30 ppm suffered from strong odor emanation during the heating, making it impossible to continue the work operation.

Packages produced by using the multilayer structures of Examples produced in the aforementioned manner are excellent in impact resistance and gas barrier property.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is excellent in impact resistance and gas barrier property. Therefore, the multilayer structure including the layer formed from the EVOH resin composition of the present disclosure is useful as a material for various packaging material containers for general foods including condiments such as mayonnaise and dressing, fermented foods such as miso, fat and oil such as salad oil, and beverages, cosmetics, and pharmaceutical products.

The invention claimed is:

1. An ethylene-vinyl alcohol copolymer composition comprising:
   (A) an ethylene-vinyl alcohol copolymer;
   (B) an aliphatic carboxylic acid metal salt; and
   (C) a sorbic acid ester;
       wherein the aliphatic carboxylic acid metal salt (B) contains a metal moiety selected from the group consisting of long Periodic Table $10^{th}$ to $12^{th}$ element metals; and
       wherein the sorbic acid ester (C) is present in an amount of 0.0001 to 10 ppm based on a total amount of the ethylene-vinyl alcohol copolymer (A), the aliphatic carboxylic acid metal salt (B), and the sorbic acid ester (C).

2. The ethylene-vinyl alcohol copolymer composition according to claim 1, wherein the aliphatic carboxylic acid metal salt (B) is present in an amount of 1 to 500 ppm on a metal basis based on the total amount of the ethylene-vinyl alcohol copolymer (A), the aliphatic carboxylic acid metal salt (B), and the sorbic acid ester (C).

3. The ethylene-vinyl alcohol copolymer composition according to claim 1 or 2, wherein a ratio (B)/(C) of a weight of the aliphatic carboxylic acid metal salt (B) on a metal basis to a weight of the sorbic acid ester (C) is 5 to 20,000.

4. A multilayer structure comprising a layer which comprises the ethylene-vinyl alcohol copolymer composition according to any one of claims 1 to 3.

5. A package comprising the multilayer structure according to claim 4.

* * * * *

UNITED STATES PATENT AND TRADEMARK OFFICE
CERTIFICATE OF CORRECTION

PATENT NO. : 11,286,377 B2
APPLICATION NO. : 16/860575
DATED : March 29, 2022
INVENTOR(S) : Ryohei Komuro It is certified that error appears in the above-identified patent and that said Letters Patent is hereby corrected as shown below:

In the Claims

Column 20, Lines 24-25 (Claim 1, Lines 8-9) please change "long Periodic Table 10th to 12th element metals" to --long Periodic Table 4th-period d-block metals--.

Column 20, Line 25 (Claim 1, Line 9) please insert the following under Line 25, --wherein the sorbic acid ester(C) is a methyl sorbate; and--.

Column 20, Line 27 (Claim 1, Line 11) please change "0.0001 to 10 ppm" to --0.00001 to 10 ppm--.

Column 20, Line 38 (Claim 3, Line 2) please change "according to claim 1 or 2" to --according to claim 1--.

Column 20, Line 43 (Claim 4, Line 3) please change "according to any one of claims 1 to 3" to --according to claim 1--.

Signed and Sealed this
Thirteenth Day of September, 2022

Katherine Kelly Vidal
*Director of the United States Patent and Trademark Office*